3,220,003
DETECTOR FOR VARYING CARRIER FREQUENCY SIGNALS

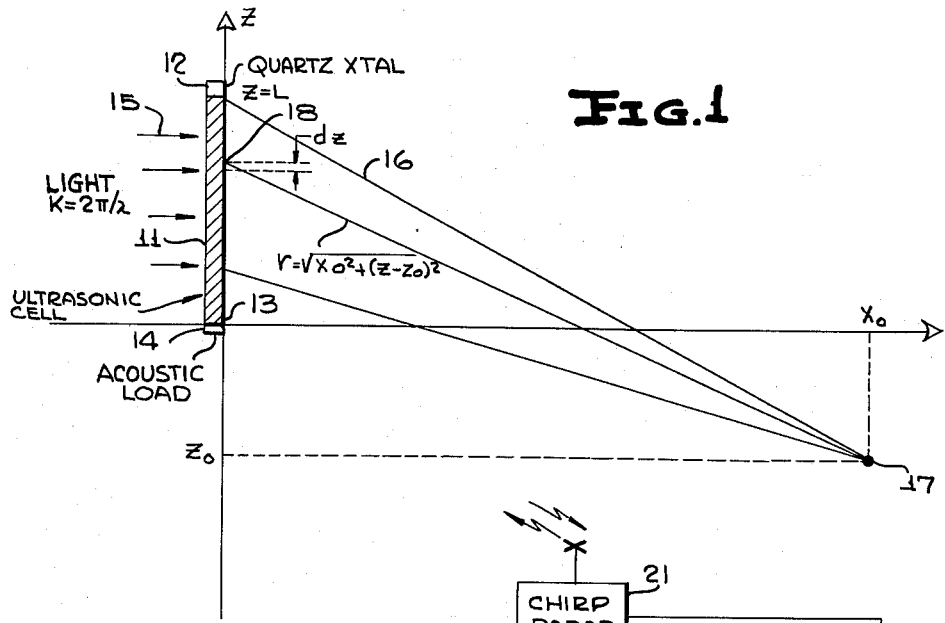
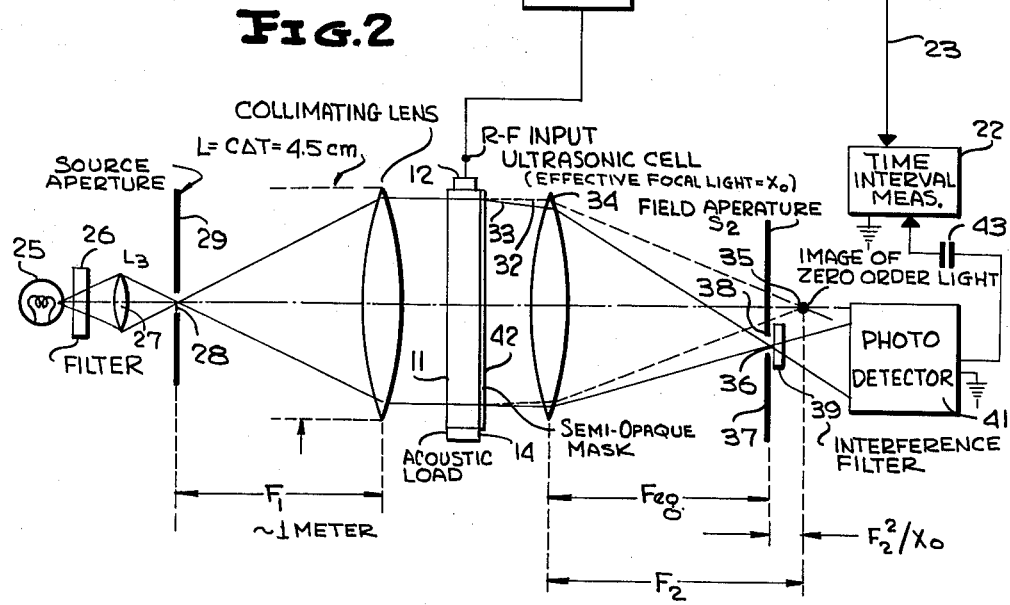

Hill Montague III, Alexandria, John S. Gerig, McLean, and Gerhard E. Hoffmann, Fairfax, Va., assignors to Scope, Inc., Falls Church, Va., a corporation of New Hampshire
Filed Sept. 25, 1962, Ser. No. 225,979
14 Claims. (Cl. 343—17.2)

The present invention relates generally to a detector for pulses of varying carrier frequency and more particularly to a detector employing an ultrasonic delay line for modulating monochromatic light in response to a variable carrier frequency pulse to be detected.

The detection of energy having varying carrier frequencies is necessary in many types of equipment, such as Chirp radar, spectrum analyzers, and scanning receivers. In such apparatus it is usually desired to accurately ascertain when a pulse having a particular predetermined frequency spectrum is being received.

In particular, a Chirp radar system utilizes a linearly varying carrier frequency which changes from one extreme to another over the duration of each pulse. The carrier of each transmitted pulse is expressed as:

$$e(t) = \cos\left(W_0 + \frac{\Delta W}{2\Delta T} t\right)t, \text{ for } o < t < \Delta T$$

where; $W_0$ is the initial carrier frequency, in radians per second,
$\Delta W$ is the frequency deviation during a transmitted pulse, in radians per second, and
$\Delta T$ is the time duration of each pulse.

The signal reflected from a target to the radar system includes the same frequency variations as the transmitted pulse but is delayed in time by twice the propagation time from the radar to the target. When the reflected signal is received back at the radar system, it is passed through a filter having appropriate group delay versus frequency characteristics. The signal envelope derived from the filter is compressed into a narrow pulse, the duration of which is approximately proportional to the reciprocal of the transmitted spectrum width, i.e.

$$\Delta T' = \frac{2\pi}{\Delta W}$$

This narrow pulse includes almost all of the energy received back at the radar so that its amplitude is quite large, thereby making it readily distinguishable from the quiescent level of the radar.

Accordingly, Chirp radar is of advantage over fixed carrier systems where peak power and pulse repetition frequency limitations exist. It enables high average transmitted powers to be achieved by the transmission of pulses having long durations without sacrificing range resolution. This is because a narrow pulse, not the long duration transmitted pulse, is utilized to provide the desired range information.

The required matched filter which compresses the received signal is an all-pass network having a suitable dispersion characteristic. In the past, the filter has frequently taken the form of a multiplicity of cascaded lumped-parameter all-pass sections. These cascaded filter sections present severe problems in design and proper functioning, due primarily to their complexity and necessity for precise alignment. Also, prior filters are capable of operating only with a fixed ratio $\Delta W / \Delta T$, hence are not operable with systems in which the deviation rate might be changed.

In the present invention, these problems are obviated by completely eliminating the need for a lumped parameter multisection filter. Instead, an ultrasonic cell or delay line responsive to the received Chirp radar signal modulates a monochromatic collimated light beam. The variable frequency signal reflected from the target establishes a compressional wave motion in the delay line which causes a variation of the refractive index in the path of the parallel light rays impinging on the cell. The change in refractive index causes the light rays to be bent in a manner similar to a fraction grating having a ruling interval equal to the acoustic wave length at the particular point in the cell. Thereby, light wave refraction is an inverse function of the wavelength set up in the cell so that the light impinging on the long sonic waves is bent less than that impinging on the shorter sonic waves.

In general light which impinges on the cell is bent at various angles, these angles being a function of the wave length of the ultrasonic signal in that portion of the cell on which the light impinges and on the order of the diffraction. The zeroth order light is not bent at all; the first order is bent through a certain angle; and higher orders are bent through proportionately greater angles. Consider only that light in the first diffraction order. The effect of the ultrasonic cell containing a linearly varying Chirp signal is to focus this light at a point. Furthermore, first order light is focused at a given point only when the Chirp signal occupies a certain position within the ultrasonic cell. Light in higher diffraction orders is also focused but at different points. By sensing when the light point for a particular diffraction order passes by a predetermined point, an indication is obtained that the frequency distribution of interest has been received.

It can be shown that the duration of the light for the first diffraction as it passes by a first order focal point is approximately $2\pi/\Delta W$, the desired detected pulse duration in a Chirp radar system. The line on which the first order diffraction focal points lie can be shown to be parallel to the cell longitudinal axis and spaced from it by $$X_0 = \frac{KC^2 \Delta T}{\Delta W}$$

where:

$K$ = the wave number of the monochromatic light $(2\pi/\lambda)$,
$C$ = velocity of propagation of the acoustic pressure wave and
$\Delta T$ and $\Delta W$ are defined supra.

To determine the precise instant $T_1$, when the entire reflected signal initially fills the delay line, a light detector is located on the line $X_0$ at a point $$Z_0 = \frac{X_0 W_0}{KC}$$

separated from the point in the delay line where a wave commensurate with $W_0$ is at time $T_1$.

To attain a unit having suitable space requirements, a converging lens is provided to focus the light emanating from the cell on an aperture positioned at $$F_{eq} = F_2\left(1 - \frac{F_2}{X_0}\right)$$

where $F_2$ is the focal length of the converging lens, and $X_0 \gg F_2$. The light passing through the aperture is coupled through an interference filter to a photodetector so that only monochromatic light having the same number as that reaching the cell affects the output.

It is obvious from the above discussion that if the rate at which the carrier frequency of the pulse is varied, i.e. the ratio $\Delta W / \Delta T$, is changed, or if the center frequncy, $W_0$, is changed, the light is still focused but at a different location. The device can readily be adjusted to act as a filter for the new signal. This requires only that the detector be moved with respect to the ultrasonic cell and lens system. This versatility is not found in other filter types.

Accordingly, it is an object of the present invention to provide a new and improved apparatus for determining when a signal possesses a predetermined frequency spectrum.

A further object of the present invention is to provide a new and improved apparatus for generating a short duration pulse in response to a signal having a predetermined frequency spectrum.

An additional object is to provide a new and improved apparatus for deriving a pulse having a duration inversely proportional to the frequency deviation of a received pulse in which the carrier frequency components vary linearly.

It is another object of the present invention to provide a detector particularly adapted for Chirp radar signals in which the need for complex cascaded lumped parameter filters is obviated and is capable of processing signals having differing carrier frequency spectrum.

An additional object of the present invention is to provide a detector for ascertaining a predetermined frequency distribution which utilizes an ultrasonic cell for modulating monochromatic light in accordance with the signal to be analyzed.

The above and still further objects, features and advantages of the present invention will become apparent upon consideration of the following detailed description of one specific embodiment thereof, especially when taken in conjunction with the accompanying drawings, wherein:

FIGURE 1 is a schematic diagram illustrating the principals of the present invention; and FIGURE 2 is a schematic diagram of one preferred form of the present invention.

Reference is now made to FIGURE 1 of the drawings upon which is illustrated an ultrasonic cell 11 containing a liquid column excited by a quartz transducer 12 at one of its ends. The quartz crystal is responsive to the pulse to be detected that has linearly varying radio frequency carrier components. The carrier input to transducer 12 varies in accordance with a Chirp radar pulse, $$\cos\left(W_o + \frac{\Delta W}{2\Delta T}t\right)t$$

where $t$ is measured from the beginning of the pulse; $W_o$, $\Delta W$ and $\Delta T$ are as defined in the introduction. It is to be understood that the signal applied to detector or transducer 12 is a replica of the wave received by the radar. It is a replica at an appropriate frequency for driving the transducer, e.g. 10 megacycles, derived by conventional beating or heterodyning techniques in a radar receiver.

The ultrasonic delay line 11 is positioned with its longitudinal axis on the Z axis of an orthogonal coordinate system and has its end 13 remote from transducer 12 located at the coordinate system origin. The other end of cell 11 is located at the point $X=0$, $Z=L$ so that the length of column 11 just equals the time, $\Delta T$, for the entire pulse to set up a wave motion in the column. To prevent wave reflections within ultrasonic cell 11, an acoustic load 14 is provided at end 13 of the column.

It is not necessary that the length of the delay line be exactly equal to the length of the pulse $\Delta T$. In fact it is desirable to have the length of the delay line somewhat greater than $\Delta T$. For the present exposition, however, the condition of equal lengths will be assumed.

The R.F. wave motion established in cell 11 modulates collimated, monochromatic light beams 15 which are directed orthogonally to the longitudinal cell axis. Some of the light emerges through cell 11 unaltered in direction while other light segments are refracted due to the wave motion of the cell medium. Because the waves at the top of the cell are of higher frequency than those at the bottom, hence of shorter wavelength, the light impinging on the top of the cell is refracted more than that at the bottom. This is because the rarefaction and compression of the medium in the column established by the waves has an effect similar to a diffraction grating, in which the grating apertures are separated by the wavelength of the signal in the column. The light waves 16 emanating from the cell have a tendency to converge at a point 17. This is similar to the light convergence established by a lens having a quadratic cross section upon which collimated light is incident.

To ascertain that the coordinates of point 17 are $$X_o = \frac{KC^2 \Delta T}{\Delta W}, \quad Z_o = \frac{-W_o X_o}{KC}$$

the following analysis is given, which analysis assumes that the entire R.F. pulse is in cell 11.

Because the excitation frequency of transducer 12 is a function of the first and second orders of time, the wave motion in cell 11 shifts the phase of the light incident on it, i.e. the light wave front direction, in accordance with $\psi(Z) = \alpha \cos(aZ + bZ^2)$, where:

$\alpha$ is the maximum amplitude of the phase shift, $Z$ is the point on the Z axis at which a particular light ray is incident, and $a$ and $b$ are constants to define the linear variation in acoustic wavelength along the length of the cell. When cell 11 is just filled by the Chirp radar signal, $$a = \frac{W_o}{c}$$

and $$b = \frac{1 \Delta W}{2C^2 (\Delta T)^2}$$

Now the amplitude of the light at any arbitrary field point 17, assumed to be $(Z_o, X_o)$, is calculated, making a distinction between the amplitude of the light and its squared magnitude which is the ordinary light intensity. To determine the light amplitude $A_p$ at point 17, $r = \sqrt{X_o^2 + (Z - Z_o)^2}$ is defined as the distance from a particular point 18 along column 11 to point 17. Then all of the contributions from the various points along the column are summed to derive the integral $$A_p = \int_o^L e^{-j[Kr + \phi(Z)]} dz$$

By substituting for $r$ and $\phi(Z)$ and rewriting the exponential sum as a product, the integral becomes $$A_p = \int_o^L e^{-jK\sqrt{X_o^2 + (Z - Z_o)^2}} e^{j\alpha \cos(aZ + bZ^2)} dz$$

Assuming that the maximum phase deviation, $\alpha$, is small compared to unity, replacing the cosine function by the sum of two exponentials, i.e.

$$\cos x = \frac{e^{jx} + e^{-jx}}{2}$$

and by utilizing the Maclaurin's expansion of an exponential function, the integral $$A_p =$$
$$\int_o^L e^{-jK\sqrt{X_o^2 + (Z - Z_o)^2}} \left\{1 + \frac{j\alpha}{2}[e^{j(aZ + bZ^2)} + e^{-j(aZ + bZ^2)}]\right\} dZ$$

is derived. The higher order terms in the exponential expansion are ignored because they are negligible compared to the first and zero order terms due to the amplitude of $\alpha$.

The first term in the brace gives the amplitude of the zero order light at field point 17 and is correctly independent of $\alpha$ in this approximation. With regard to the second term, note that if $z_o$ is negative (to anticipate a later result) then the exponent involving the square root sign is a negative imaginary quantity whose magnitude increases with $z$ for positive $z$. Thus, the second term in the square brackets in which the exponential has a positive imaginary argument with magnitude increasing with $z$ is the important term as leads to an integrand whose net oscillation is small. Factoring out this second term which corresponds to first order diffraction, we obtain:

$$A_D = \frac{j\alpha}{2} \int_0^L e^{-jF(z,z0,x0)} dz$$

where by definition $$F(z,z_0,x_0) = K\sqrt{x_0^2 + (z-z_0)^2} - az - bz^2.$$

The function F, which depends upon the variable of integration $z$ and on the co-ordinates of the field point, represents the relative phases of the various contributions from ultrasonic cell 11 to field point 17. If F varies rapidly with $z$, the integrand oscillates rapidly between ±1 and the resultant value of the integral is small. At one or more particular field points, however, F may vary only slightly with $z$ for $0 < z < L$ and here the various contributions from ultrasonic cell 11 interfere constructively. To determine these points, $\sqrt{x_0^2 + (z-z_0)^2}$ is expanded in a Taylor series about $z=0$ to obtain $$\sqrt{x_0^2 + (z-z_0)^2} = r_0 - z\frac{z_0}{r_0} + \frac{z^2}{2}\frac{x_0^2}{r_0^3} + \frac{z^3}{2}\frac{x_0^2 z_0}{r_0^5} + \ldots$$

where $r_0 = \sqrt{x_0^2 + z_0^2}$ and the condition that, in $F(z)$, the coefficients of $z$ and $z^2$ vanish is imposed. This leads to $$\frac{kz_0}{r_0} = -a$$

$$\frac{kx_0^2}{2r_0^3} = b$$

or substituting for $a$ and $b$ and rearranging leads to the following basic formula which are the chief results of this analysis:

$$\frac{z_0}{r_0} = -\frac{w_0}{kc}$$

$$x_0 = \frac{kc^2 \Delta T}{\Delta w} \cdot \frac{x_0^3}{r_0^3} = \frac{kc^2 \Delta T}{\Delta w}$$

The first result is exactly the condition for the scattering angle of the first order light at the mean frequency. The second gives the distance $x_0$ from the ultrasonic cell at which the light converges, that is, the effective focal length of the lens formed by the diffraction grating. In evaluating $x_0$, we have used the fact that in practice $|z_0| \ll r_0$ so that $r_0 \approx x_0$. Concerning these results, note the following: In the present co-ordinate system, $z_0$ is negative as assumed above, and corresponds to the hypothetical point along the ultrasonic cell at which the extrapolated acoustic frequency would pass through zero. More important, the effective focal length of the lens depends on the Chirp rate $\Delta W/\Delta T$ and otherwise only on the wavelength of the light and the velocity of acoustic propagation. As the frequency deviation is reduced, the focal length increases and in the limit of zero deviation, the focal point is at infinity corresponding to collimated light emerging from the ultrasonic cell.

As a numerical example, assume 5000 angstrom unit light for rays 15, take 1500 meters per second as the velocity of propagation of the medium in cell 11, and assume a 30-microsecond pulse chirped over a 1 megacycle deviation. Substituting these values gives 135 meters as the approximate focal length of the diffraction grating lens. In a practical system, of course, an auxiliary lens or pair of lenses is used to bring the over-all optical path length to the focal point down to the order of one or two meters.

For the moment, it is simply assumed that an optical path of approximately 135 meters is used, in order to show that the degree of pulse compression obtainable in this case is that desired in Chirp radar, i.e. $\Delta T' = 2\pi/\Delta W$. The physical argument used is the following: Suppose that ultrasonic cell 11 is very long and is illuminated along its entire length by collimated light 15. Then, as the ultrasonic wave train of length $C\Delta T$ travels down the cell 11 (in all of the preceding discussion it has been assumed that the ultrasonic wave was frozen at a particular position) the co-ordinate $z_0$ travels downwardly also with acoustic velocity C. As the focused image passes by a slit in the focal plane $X_o$, the duration of the pulse formed is determined by the lateral extent, $\Delta z$, of the image as limited by diffraction effects.

The actual lateral extent of the source, namely the wave train in cell 11 is $L = C\Delta T$. Therefore, the angular resolution of the optical system is $\lambda/L$ radians and this small angle multiplied by the focal length $x_0$ gives as the length of the image, $\Delta z$, of the diffraction pattern in the focal plane, $$\Delta z = \frac{\lambda x_0}{L} = \frac{\lambda x_0}{C\Delta T}$$

This quantity, divided by the velocity of acoustic propagation, C, gives the time duration of the compressed pulse, $\Delta T'$, as follows:

$$\Delta T' = \frac{\Delta z}{C} = \frac{\lambda x_0}{C^2 \Delta T} = \frac{\lambda}{C^2 \Delta T} \cdot \frac{k\Delta T C^2}{\Delta w} = \frac{2\pi}{\Delta w}$$

Thus, the duration of the pulse as it passes by point 17 is exactly the same as attained by the previously utilized lumped parameter cascaded filter so that high resolution may be attained of the target position. The use of auxiliary lenses does not affect the conclusion but simply scales down the slit width and the apparent diffraction pattern velocity.

Reference is now made to FIGURE 2 of the drawings which discloses how the concepts of FIGURE 1 are practically embodied in a Chirp radar system. The Chirp radar 21 periodically transmits electromagnetic pulses having the previously defined waveform. Upon the completion of each transmitted pulse, a signal is coupled from radar 21 to a time interval measuring apparatus 22 via lead 23. This signal initiates a timing cycle in apparatus 22 which is terminated in response to an output of the detecting filter apparatus so that an indication of target range is provided.

In response to the reflected signal, radar 21 drives crystal transducer 12 to establish the compressional wave motion in cell 11 discussed supra. The parallel monochromatic light incident on cell 11 is derived from incandescent lamp 25. The light rays emanating from lamp 25 are passed through interference filter 26 to permit only monochromatic light of a specified wavelength to reach condensing lens 27. Lens 27 focuses this light onto pinhole 28 in opaque screen 29.

Light emanating from aperture 28 passes to collimating lens 31, having a focal length of approximately one meter. The resulting parallel light rays are modulated by the waves established in the medium of column 11 by the Chirp radar signal to produce zero and first order beams 32 and 33, shown by the dashed and solid lines emanating from the cell. The waves derived from cell 11 are incident on condensing lens 34 which has approximately a one meter focal length, $F_2$, to form an image of the zero order light at point 35.

An image of the first order light is established at point 36 when cell 11 is just filled with the Chirp radar pulse. Prior and subsequent to cell 11 being completely filled with the pulse, the first order image is focused at locations above and below point 36, respectively, because of the varying diffraction gratings established by the waves in the cell medium.

To provide minimum transverse dimensions for the filter unit, cell 11 and lenses 31 and 34 are approximately equal in length to $C\Delta T$, the space required in cell 11 for it to be just completely filled with the Chirp radar pulse.

To detect the passage of the first order image past point 36, an opaque screen 37 is positioned so that its aperture 38 lies on point 36. Screen 37 is positioned in the plane which the focal point for the first order light derived from cell 11 lies. This plane is parallel to and separated from the longitudinal axis of lens 34 by $$F_{eq} = F_2\left(1 - \frac{F_2}{X_o}\right)$$

if $X_o \gg F_2$, as is usually the case. Positioned behind aperture 38 is another interference filter 39 to block the passage of light other than that having the selected wavelength. The light passing through filter 39 impinges on photodetector 41, which may take the form of a conventional photo-multiplier tube.

Photo-detector 41 generates an output pulse for the entire duration in which the first order light is incident on it, approximately $2\pi/\Delta W$. This pulse is coupled to time interval measuring system 22 to terminate its cycle of operation and provide an indication of the time between the trailing edges of the transmitted and received pulses. The time of occurrence of the signal supplied by photo-detector 41 to measuring apparatus 22 is indicative of when the trailing edge of the reflected signal occurs because it is only at this time that cell 11 is just completely filled with compressional waves to cause light to pass by slit 38.

The photodetector 41 serves the same function as a square low diode detector in converting a R.F. wave to a low frequency signal having the shape of the R.F. envelope. The photodetector, however, is capable of detecting signals having considerably greater amplitude variations than a diode.

In order to taper the amplitude response of the output of photodetector 41 to reduce the sidelobe level of the pulse to an undiscernible level, a semiopaque mask 42 is positioned along the length of cell 11 on the side from which rays 33 and 34 emanate. Ideally the density of this mask should vary in the Z direction according to the so-called Dolph-Tchebycheff function.

The output of photo-detector 41 is a video waveform in which the D.C. component is unimportant. In consequence, A.C. coupling between detector 41 and measuring apparatus 22 is employed by using capacitor 43 to remove the D.C. ambient light signal produced by the detector in response to stray light that may penetrate the light opaque container in which the system is maintained.

It is to be understood that the term "Chirp radar" as utilized in both the specification and claims is synonymous with a radar system in which frequency modulated pulses are derived.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for detecting signals having a predetermined carrier frequency variation comprising a source of monochromatic, parallel light rays, an ultrasonic cell for modulating said rays, said cell being responsive to said signals, whereby light diffraction patterns of higher than zero order are established at predetermined points in space, and means for detecting when one of said patterns is focused on one of said predetermined points.

2. A system for detecting signals having a predetermined carrier frequency variation comprising a source of parallel, monochromatic light rays, means responsive to said signals for modulating said light says, said means for modulating establishing a moving compressional wave for varying the wave front of said light as a function of light ray position, time and amplitude of said signal, whereby moving light diffraction patterns of higher than zero order are established at predetermined points in space, and means for detecting when one of said patterns is focused on one of said points.

3. A system for detecting a signal having a linearly varying carrier frequency within predetermined bounds comprising a source of monochromatic, parallel light rays, an ultrasonic cell responsive to said signal for modulating said light rays, whereby a moving first order diffraction pattern is established at predetermined points in space, and means for detecting when said pattern is focused on one of said points.

4. A system for detecting the occurrence of a pulse of predetermined duration, $\Delta T$, and having carrier components in accordance with cos $$\left(W_o + \frac{\Delta W}{2\Delta T}t\right)t$$

where:
$W_o$ is the initial carrier frequency of the pulse in radians per second,
$\Delta W$ is the frequency deviation of the carrier frequency of the pulse, in radians per second,
and $t$ is time in seconds measured from the beginning of the pulse, comprising a source of monochromatic, parallel light rays, an ultrasonic cell responsive to said pulse for modulating said rays, said cell being at least equal in length to $C\Delta T$, where C is the propagation velocity of said signal in the medium of the cell, whereby a moving first order diffraction pattern is established at predetermined points in space, and means for detecting when said pattern is focused on a predetermined one of said points.

5. The system of claim 4 wherein said point is effectively located in a plane parallel to and separated from the longitudinal axis of the cell by approximately $$X_o = \frac{KC^2\Delta T}{\Delta W}$$

where $$K = \frac{2\pi}{\lambda}$$

and $\lambda$ = the wavelength of said light.

6. The system of claim 5 wherein said cell is driven at one end by said signal, and said point is effectively located in said plane from said end by approximately $$R = \sqrt{X_o^2 + \left(C\Delta T + \frac{X_o W_o}{KC}\right)^2}$$

7. The system of claim 5 including a condensing lens for the modulated light emanating from said cell, said lens having a predetermined focal length $F_2 \ll X_o$, and the actual location of said plane is separated from the longitudinal axis of the cell by $$F_{eq} = F_2\left(1 - \frac{F_2}{X_o}\right)$$

8. A Chirp radar detection system comprising means for transmitting and receiving Chirp radar pulses, a source of monochromatic, parallel light rays, an ultrasonic cell responsive to the received pulses for modulating said light rays, said cell being of sufficient length to establish wave motion for the entire pulse simultaneously, whereby a moving first order diffraction pattern is established at predetermined points in space, means for generating a signal when said pattern is focused on a predetermined one of said points, and means for measuring the time interval between the termination of a transmitted pulse and the time of occurrence of the signal resulting from said pulse being received.

9. The system of claim 8 including means for focusing light emanating from said cell onto said points.

10. The system of claim 9 wherein a semi-opaque mask is provided between said cell and said lens, said mask having a suitable distribution of opaqueness to confine light in said patterns to a single lobe shape.

11. The system of claim 8 wherein said means for generating includes a photo-detector responsive to the modulated light rays, and means for coupling only A.C. waves between said photo-detector and said means for measuring.

12. A system for detecting a signal having a linearly varying carrier frequency varying within predetermined bounds comprising a source of monochromatic, parallel light rays, means responsive to said signal for modulating said light rays, said means for modulating establishing a moving compressional wave for varying the wave front of said light as a function of light ray position, time and amplitude of said signal, whereby a moving first order diffraction pattern is established at predetermined points in space, and means for detecting when said pattern is focused on one of said points.

13. A system for detecting the occurrence of a pulse of predetermined duration, $\Delta T$, and having carrier components in accordance with cos $$\left(W_o + \frac{\Delta W}{2\Delta T} t\right) t$$

where $W_o$ is the frequency deviation of the pulse in radians per second, $\Delta W$ is the frequency deviation of the carrier frequency of the pulse, in radians per second and $t$ is time in seconds, measured from the beginning of the pulse, comprising a source of monochromatic parallel light rays, means responsive to said pulse for modulating said light rays, said means for modulating establishing a moving compressional wave for varying the wave front of said light as a function of light ray position, time and amplitude of said signal, said moving compressional wave being established over a length equal at least to $C\Delta T$, where $C$ is the velocity of propagation of said wave, whereby a moving first order diffraction pattern is established at predetermined points in space, and means for detecting when said pattern is focused on a predetermined one of said points.

14. A Chirp radar detection system comprising means for transmitting and receiving Chirp radar pulses, a source of monochromatic, parallel light rays, means responsive to said pulses for modulating said light rays, said means for modulating establishing a moving compressional wave for carying the wave front of said light as a function of light ray position, time and amplitude of said signal, whereby a moving first order diffraction pattern is established at predetermined points in space, means for generating a signal when said pattern is focused on a predetermined one of said points, and means for measuring the time interval between the termination of a transmitted pulse and the time of occurrence of the signal resulting from said pulse being received.

References Cited by the Examiner
UNITED STATES PATENTS

| | | |
|---|---|---|
| 2,418,964 | 4/1947 | Arenberg. |
| 2,943,315 | 6/1960 | Rosenthal _____ 343—13 |
| 3,088,113 | 4/1963 | Rosenthal _____ 343—17.1 |
| 3,111,666 | 11/1963 | Wilmotte _____ 343—13 |

CHESTER L. JUSTUS, *Primary Examiner.*